US008839138B1

(12) United States Patent
Pasqua

(10) Patent No.: US 8,839,138 B1
(45) Date of Patent: Sep. 16, 2014

(54) SYSTEMS AND METHODS FOR TRANSITIONING BETWEEN USER INTERFACE ENVIRONMENTS

(75) Inventor: Joseph Pasqua, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 868 days.

(21) Appl. No.: 12/643,181

(22) Filed: Dec. 21, 2009

(51) Int. Cl.
*G06F 3/048* (2013.01)
*G06F 3/00* (2006.01)

(52) U.S. Cl.
USPC .......................................... 715/778; 715/703

(58) Field of Classification Search
USPC .................................................. 715/703, 778
See application file for complete search history.

(56) References Cited

U.S. PATENT DOCUMENTS

| | | | | |
|---|---|---|---|---|
| 5,950,195 | A * | 9/1999 | Stockwell et al. | 1/1 |
| 6,584,508 | B1 * | 6/2003 | Epstein et al. | 709/229 |
| 7,353,465 | B2 * | 4/2008 | Callaway et al. | 705/7.13 |
| 7,424,709 | B2 * | 9/2008 | Neiger et al. | 718/1 |
| 7,676,673 | B2 * | 3/2010 | Weller et al. | 713/164 |
| 8,261,320 | B1 * | 9/2012 | Serenyi et al. | 726/2 |
| 2005/0091486 | A1 * | 4/2005 | Avraham et al. | 713/162 |
| 2006/0136912 | A1 * | 6/2006 | Robinson et al. | 718/1 |
| 2007/0169120 | A1 * | 7/2007 | Schoenberg et al. | 718/1 |
| 2009/0254572 | A1 * | 10/2009 | Redlich et al. | 707/10 |
| 2010/0070971 | A1 * | 3/2010 | Shlomai et al. | 718/1 |
| 2010/0175064 | A1 * | 7/2010 | Brahmaroutu | 718/1 |
| 2010/0235649 | A1 * | 9/2010 | Jeffries et al. | 713/189 |
| 2010/0257578 | A1 * | 10/2010 | Shukla et al. | 726/1 |
| 2011/0154229 | A1 * | 6/2011 | Allard et al. | 715/764 |

OTHER PUBLICATIONS

Morimoto; Rand H. et al., Microsoft Exchange Server 2010 Unleashed, Oct. 15, 2009, Sams, ISBN-10: 0-672-33046-6, pp. 80-81, 85, 905-912, 948-949.*
IEEE 100, The Authoritative Dictionary of IEEE Standards Terms, 7th edition, copyright 2000 by The Institute of Electrical and Electronics Engineers. ISBN 0-7381-2601-2. virtual machine definition. p. 1256.*
Enhancing Deployment and Management for Virtual PCs in Enterprise Environments; http://www.microsoft.com/windows/enterprise/produces/mdop/med-v.aspx; Taken From site on Oct. 8, 2009.
Returnil—The Real Security for your home or business; http://www.returnilvirtual system.com; Taken from site on Oct. 20, 2009.
Sandboxie—Trust no Program; http://www.sandboxie.com; Taken from site on Oct. 20, 2009.
VMware Fusion—Break Down the Walls Between PC and Mac; http://www.vmware.com/products/fusion/features.html; Taken from site on Oct. 20, 2009.

(Continued)

*Primary Examiner* — Doon Chow
*Assistant Examiner* — Wilson Varga
(74) *Attorney, Agent, or Firm* — ALG Intellectual Property, LLC

(57) ABSTRACT

A computer-implemented method for transitioning between user interface environments. The method may include determining that a user is interacting with a first user interface environment of a computing system and identifying a trigger associated with switching from the first user interface environment of the computing system to a second user interface environment of the computing system. The method may also include, in response to the trigger, swiveling into the second user interface environment by presenting the second user interface environment to a user in a manner that enables the user to interact with the second user interface environment. Various other methods, systems, and computer-readable media are also disclosed herein.

20 Claims, 8 Drawing Sheets

(56) References Cited

OTHER PUBLICATIONS

Returnil; Increase your PC protection; http://www.returnilvirtualsystem.com/, as accessed on Oct. 7, 2009.

Sandboxie; Sandbox software for application isolation and secure web browsing; http://www.sandboxie.com/, as accessed on Oct. 7, 2009.

VMware, Inc.; Why VMware Fusion, Run Windows programs on Mac, Virtual PC on Mac; http://www.vmware.com/products/fusion/features.html, as accessed on Oct. 7, 2009.

Microsoft; Microsoft Windows Enterprise, Improving Virtual PCs with Med-V; http://www.microsoft.com/windows/enterprise/products/mdop/med-v.aspx, as accessed on Oct. 7, 2009.

* cited by examiner

SYSTEMS AND METHODS FOR TRANSITIONING BETWEEN USER INTERFACE ENVIRONMENTS

BACKGROUND

Information Technology ("IT") departments in enterprises, governments, and other institutions are increasingly focused on controlling endpoints in their networks. IT departments may control what software can be installed on an endpoint (e.g., only software approved by the IT department may be installed on the endpoint), what type of data can be stored on an endpoint (e.g., no personal information may be stored on the endpoint), which network an endpoint can connect to, etc. IT departments may implement these types of controls on desktops, laptops, mobile devices, and various other types of computing systems. Unfortunately, this approach to endpoint control is at odds with the trend towards consumerization of IT and is not user friendly.

As a result of the controls implemented on endpoints, many people may have two devices—one for work and one for personal use. Furthermore, some users may circumvent the controls put in place by an IT department (e.g., by storing sensitive work-related information on a personal device), leaving the institution with a false sense of security.

Some institutions may attempt to address these issues by implementing multiple virtual machines on a single device. For example, a user may be able to access a work virtual machine and a personal virtual machine on a laptop. Unfortunately, such solutions typically do not provide a seamless, unified experience for end users. For example, while working on her personal calendar a user may be unable to see her work meetings. What is needed, therefore, is a more efficient and effective mechanism for providing users with a more unified experience when accessing information from different computing environments.

SUMMARY

As will be described in greater detail below, the instant disclosure generally relates to systems and methods for transitioning between user interface environments (e.g., virtual machines, alternate desktop environments, virtualized instances of applications, remote desktop sessions, etc.). For example, embodiments of the instant disclosure may project data from a work computing environment into a personal computing environment. Embodiments of the instant disclosure may additionally or alternatively facilitate swiveling between two different computing environments. For example, a computer-implemented method for transitioning between user interface environments may include: 1) determining that a user is interacting with a first user interface environment of a computing system, 2) identifying a trigger associated with switching from the first user interface environment of the computing system to a second user interface environment of the computing system, and 3) in response to the trigger, swiveling into the second user interface environment by presenting the second user interface environment to a user in a manner that enables the user to interact with the second user interface environment.

The method may include projecting data from the second user interface environment into the first user interface environment by providing at least a representative portion of the data in the first user interface environment. In such embodiments, projecting the data from the second user interface environment into the first user interface environment may include preventing a potentially sensitive portion of the data from being provided to the first user interface environment.

Any suitable type of data may be projected between user interface environments. For example, the data may include a calendar entry. In this example, the representative portion of the data may include a time and date of the calendar entry, and the potentially sensitive portion of the data may include a subject of the calendar entry. Other types of data that may be projected between user interface environments include notification data, email data, notes, office documents, and various other types of data.

Various events may trigger swiveling between user interfaces. For example, the trigger may be a user's attempt to access a representative portion of data projected into the first user interface environment. Additionally or alternatively, the trigger may include an attempt to install an application associated with the second user interface environment, an attempt to access a portion of an application associated with the second user interface environment, an attempt to open a type of file associated with the second user interface environment, an attempt to access a file that contains content associated with the second user interface environment, an attempt to access a file tagged as being associated with the second user interface environment, and/or a user account control event associated with the second user interface environment.

Swiveling between user interface environments may be performed in a variety of ways. For example, swiveling into a second user interface environment may include removing a first user interface environment from a foreground of a graphical user interface of the computing system and bringing the second user interface into the foreground of the graphical user interface. Alternatively, swiveling between user interface environments may include deactivating or terminating a first user interface environment and activating or starting a second user interface environment.

In certain embodiments, a system for swiveling between user interface environments may include: 1) at least one processor, 2) a determination module programmed to direct the processor to determine that a user is interacting with a first user interface environment of a computing system, 3) an identification module programmed to direct the processor to identify a trigger associated with switching from the first user interface environment of the computing system to a second user interface environment of the computing system, and 4) a swivel module programmed to, in response to the trigger, swivel into the second user interface environment by presenting the second user interface environment to a user in a manner that allows the user to interface with the second user interface environment.

The projection module may be programmed to project data from the second user interface environment into the first user interface environment by providing at least a representative portion of the data in the first user interface environment. The projection module may be further programmed to direct the processor to prevent potentially sensitive portion of the data from being provided to the first user interface environment. The projection module may execute in an environment external to the first and second user interface environments.

In some embodiments, a computer-implemented method for transitioning between user interface environments may include: 1) projecting data from a second user interface environment of a computing system into a first user interface environment of the computing system by providing at least a representative portion of the data in the first user interface environment, 2) identifying an attempt to access the representative portion of the data from within the first user interface environment, and 3) in response to the attempt, swiveling into the second user interface environment by presenting the second user interface environment to a user in a manner that allows the user to interact with the second user interface environment.

The method may also include, after swiveling into the second user interface environment, presenting the data to the user. In some embodiments, projecting the data into the first user interface environment may include receiving the representative portion of the data at a database external to the first and second user interface environments and sending the representative portion of the data from the database to the first user interface environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
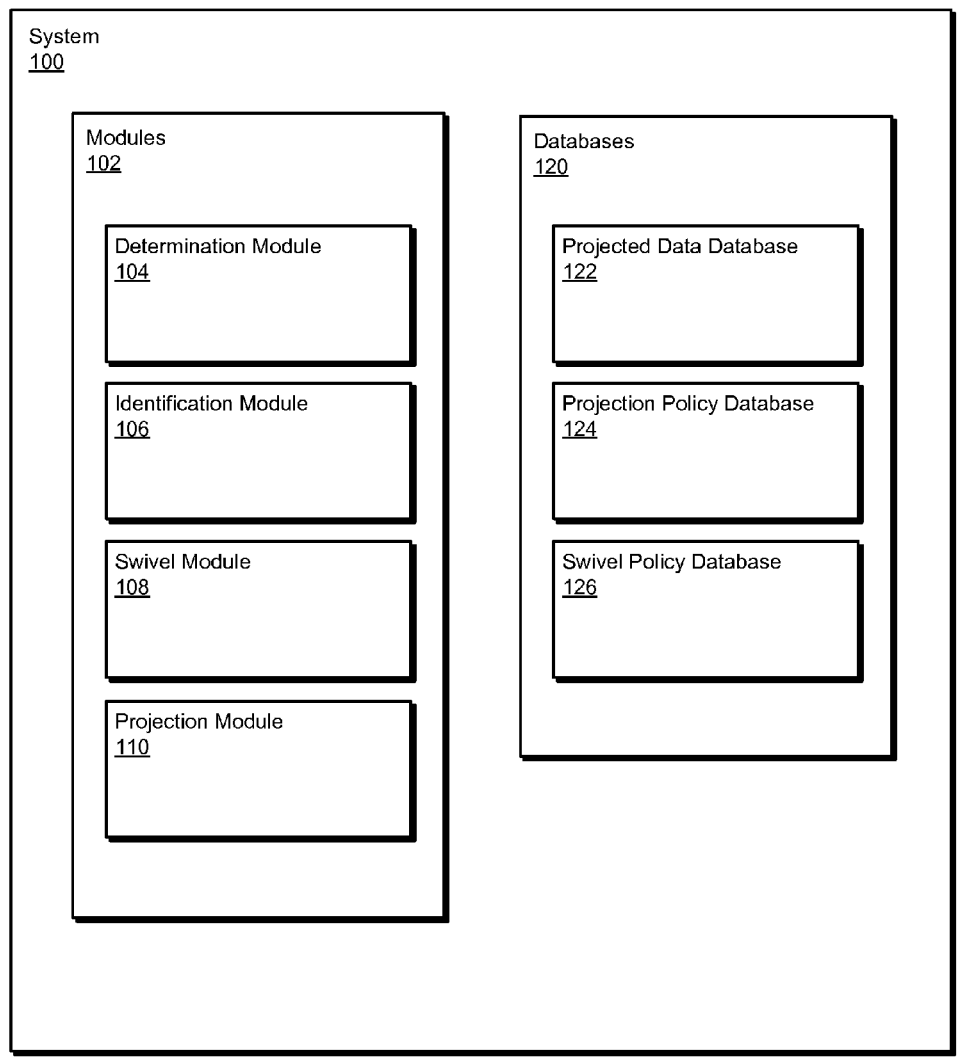
FIG. 1 is a block diagram of an exemplary system for transitioning between user interface environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for transitioning between user interface environments, such as virtual machines and various other types of environments. Systems and methods disclosed herein may effectively transition between environments by projecting data between environments and swiveling between environments. For example, calendar entries, bookmarks, notifications, and/or other data may be projected from a user's work computing environment to the user's personal computing environment by providing a representative portion of the data in the personal computing environment. When the user attempts to access the data projected into the personal computing environment, the user's computing system may swivel from the personal computing environment into the user's work computing environment. Various other cues may also trigger swiveling between a user's computing environments.

Figure 2:
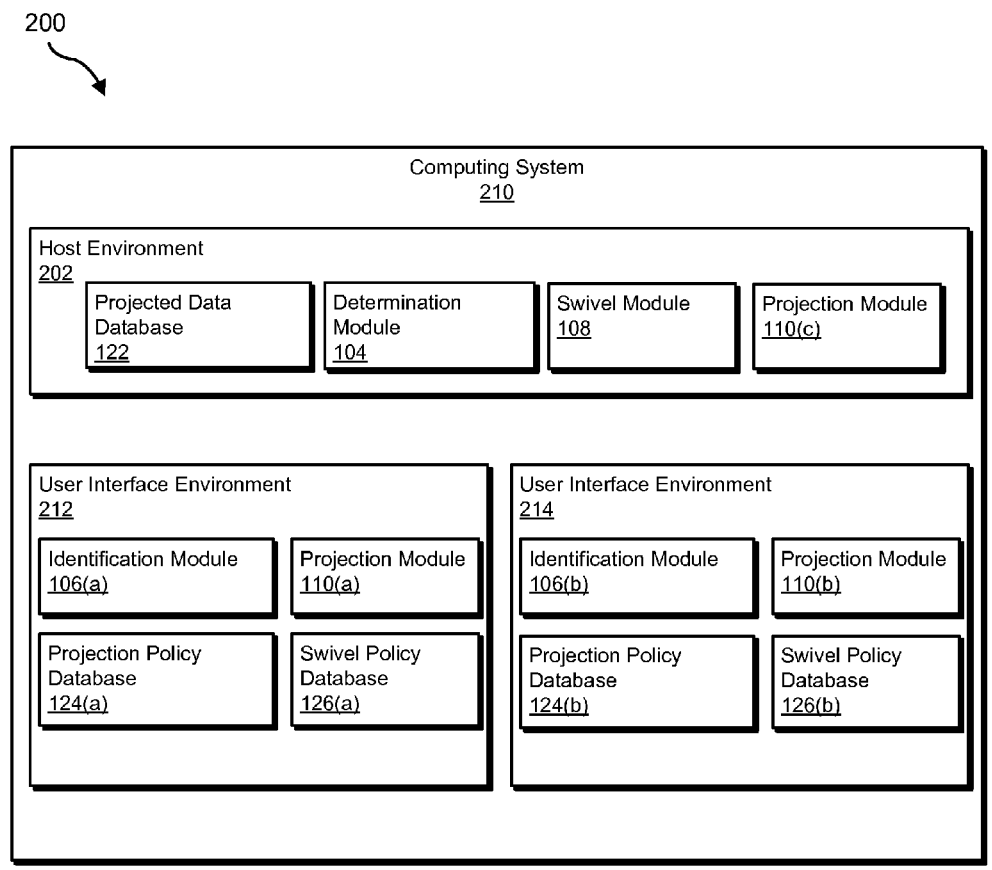
FIG. 2 is a block diagram of another exemplary system for transitioning between user interface environments.
Figure 5:
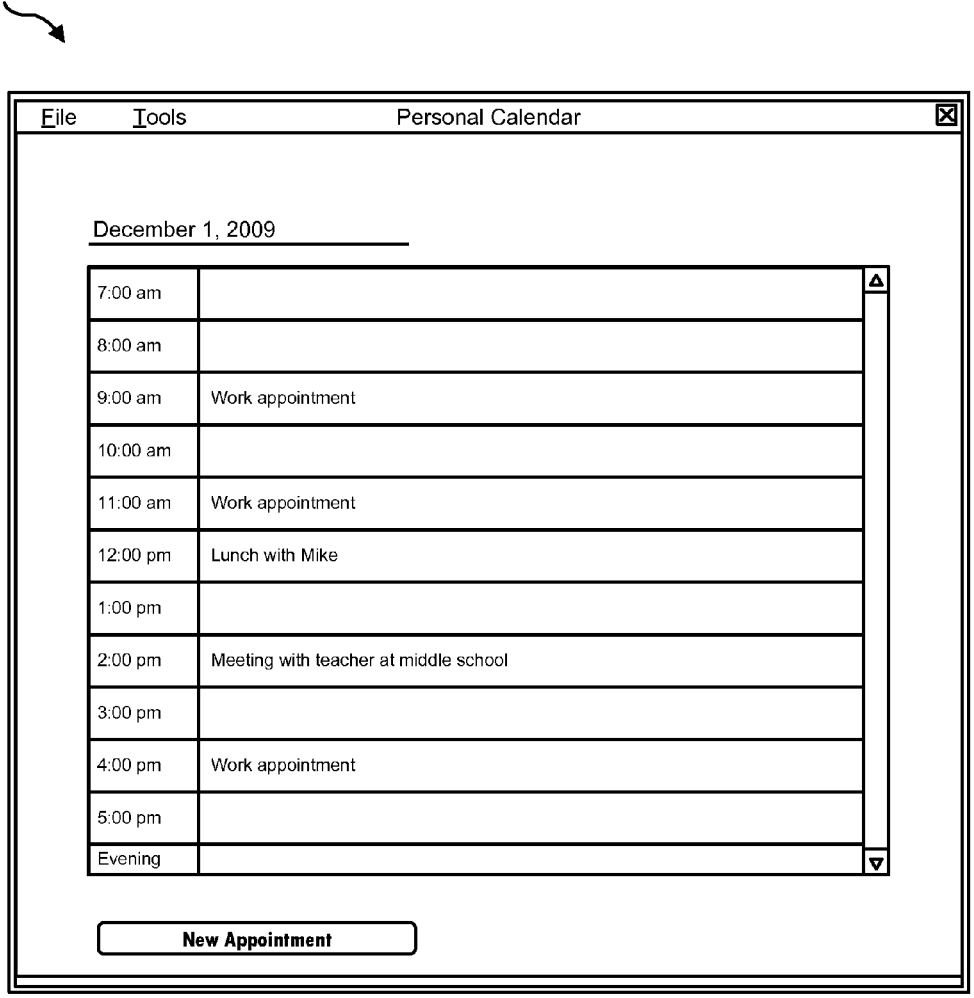
FIG. 5 is a block diagram of an exemplary user interface in a personal computing environment.
Figure 6:
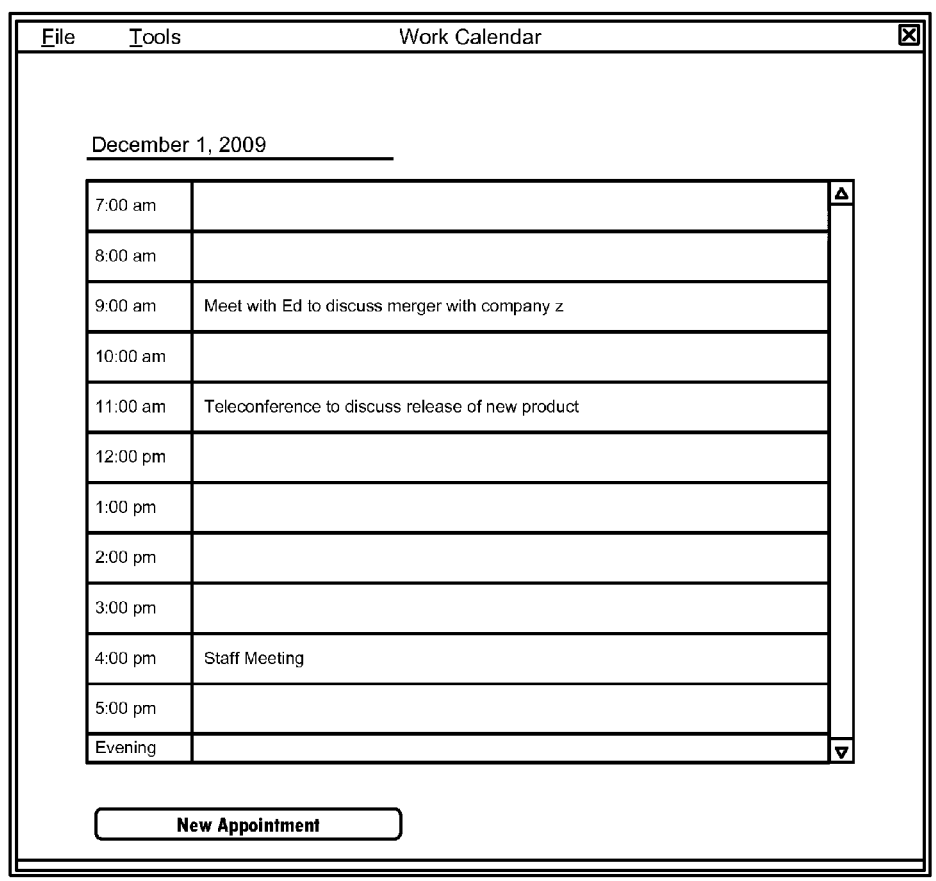
FIG. 6 is a block diagram of an exemplary user interface in a work computing environment.

The following will provide, with reference to FIGS. 1-2, detailed descriptions of exemplary systems for transitioning between user interface environments. Detailed descriptions of corresponding computer-implemented methods will also be provided in connection with FIGS. 3 and 4. FIGS. 5 and 6 show exemplary interfaces associated with different computing environments. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for transitioning between user interface environments. As illustrated in this figure, exemplary system 100 may include one or more modules 102 for performing one or more tasks. For example, and as will be explained in greater detail below, exemplary system 100 may include a determination module 104 programmed to determine that a user is interacting with a first user interface environment of a computing system. Exemplary system 100 may also include an identification module 106 programmed to direct the processor to identify a trigger associated with switching from the first user interface environment of the computing system to a second user interface environment of the computing system.

In addition, and as will be described in greater detail below, exemplary system 100 may include a swivel module 108 programmed to, in response to the trigger, swivel into the second user interface environment by presenting the second user interface environment to a user in a manner that allows the user to interact with the second user interface environment. System 100 may also include a projection module 110 programmed to project data from the second user interface environment into the first user interface environment by providing at least a representative portion of the data in the first user interface environment. Projection module 110 may be further programmed to direct the processor to prevent potentially sensitive portion of the data from being provided to the first user interface environment. The projection module may also be programmed to direct the processor to prevent potentially sensitive portions of the data from being provided to the first user interface environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 210), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a projected data database 122 for storing data projected from one user interface environment into another user interface environment. System 100 may also include a projection policy database 124 for storing one or more projection policies that may define what data is projected between user interface environments and how such data should be projected. System 100 may further include a swivel policy database 126 for storing one or more swivel policies that indicate which cues trigger swiveling from one environment to another environment.

Databases 120 in FIG. 1 may represent a portion of one or more computing devices. For example, databases 120 may represent a portion of computing system 210 in FIG. 2, computing system 710 in FIG. 7, and/or portions of exemplary network architecture 800 in FIG. 8. Alternatively, databases 120 in FIG. 1 may represent one or more physically separate devices capable of being accessed by a computing device, such as computing system 710 in FIG. 7 and/or portions of exemplary network architecture 800 in FIG. 8.

In some embodiments, exemplary system 100 may be implemented as multiple user interface environments that interact with a host environment. For example, as shown in FIG. 2, system 200 may include a computing system 210. Computing system 210 may include a host environment 202, a user interface environment 212, and a user interface environment 214. Host environment 202 may include projected data database 122, determination module 104, swivel module 108, and projection module 110(c). Host environment 202 may include a DOM 0 environment, a hypervisor, and/or any other computing environment capable of managing swiveling between user interface environments.

User interface environment 212 may include an identification module 106(a), a projection module 110(a), a projection policy database 124(a), and a swivel policy database 126(a). Similarly, user interface environment 214 may include an identification module 106(b), a projection module 110(b), a projection policy database 124(b), and a swivel policy database 126(b).

Identification modules 106(a) and (b) may identify triggers within user interface environments 212 and 214 that indicate that computing system 210 should swivel between user interface environments 212 and 214. Identification modules 106 (a) and (b) communicate with swivel module 108 to prompt swivel module 108 to swivel between user interface environments 212 and 214.

Projection module 110(a) may manage projection data for user interface environment 212, and projection module 110 (b) may manage projection data for user interface environment 214. For example, projection module 110(a) may scrape data from applications within user interface environment 212 and may publish the data to projected data database 122. Projection module 110(a) may also subscribe to updates to receive projected data from other user interface environments, such as user interface environment 214. Projection module 110(b) may provide similar functionality for user interface environment 214. Projection module 110(c) may communicate with projection modules 110(a) and 110(b) to sync projection data between user interface environments 212 and 214. Projection module 110(c) may hold projected data in projected data database 122.

Computing system 210 generally represents any type or form of computing device capable of reading computer-executable instructions. Examples of computing system 210 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

While FIG. 2 shows the system of FIG. 2 deployed in a configuration that may be implemented in a single computing device, exemplary system 100 in FIG. 1 may be deployed in a variety of other ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 3:
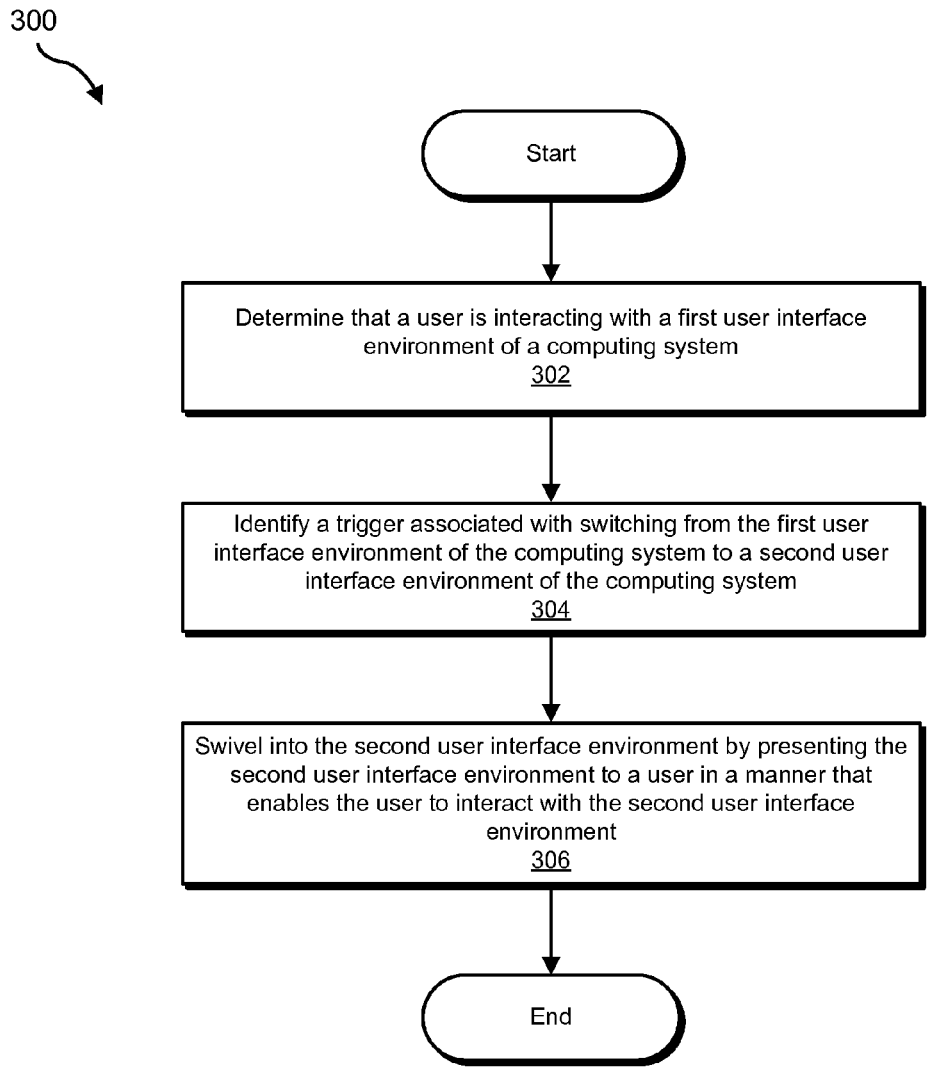
FIG. 3 is a flow diagram of an exemplary method for transitioning between user interface environments.

FIG. 3 is a flow diagram of an exemplary computer-implemented method for transitioning between user interface environments. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. At step 302 in FIG. 3, one or more of the systems described herein may determine that a user is interacting with a first user interface environment of a computing system. For example, determination module 104 in FIG. 2 may determine that a user is interacting with user interface environment 212 of computing system 210.

Determination module 104 may determine that a user is interfacing with user interface environment 212 in any suitable manner. For example, determination module 104 may determine that a user is interacting with user interface environment 212 by determining that user interface environment 212 is active and/or running. Additionally or alternatively, determination module 104 may infer from input and/or output to and from user interface environment 212 that a user is interacting with user interface environment 212. In some embodiments, determination module 104 may determine that the user is interacting with user interface environment 212 when a swivel trigger is detected within user interface environment 212. In some embodiments, the determination that the user is interacting with user interface environment 212 simply includes any action that informs swivel module 108 of a currently active user interface environment that swivel module 108 may cause computing system 210 to swivel away from.

As used herein, the phrase "user interface environment" generally refers to a computing environment configured to run one or more applications and provide a graphical user interface with which a user may interact. In other words, the phrase "user interface environment" refers to an execution environment (e.g., a virtual machine, an alternate desktop environment, a virtualized instance of an application, a remote desktop session, etc.) and an interface presented by such an execution environment. Thus, when a computing system switches between user interface environments, the interface viewed by a user will change.

A computing system, such as computing system 210, may provide one or more user interface environments. For example, computing system 210 may include a user's work user interface environment, a user's personal user interface environment, a disposable user interface environment that acts as a sandbox for the user, and/or any other type of user interface environment. While FIG. 2 shows two user interface environments, computing system 210 may include any suitable number of user interface environments.

At step 304 in FIG. 3, one or more of the systems described herein may identify a trigger associated with switching from the first user interface environment of the computing system to the second user interface environment of the computing system. For example, identification module 106(a) may identify a trigger associated with switching from user interface environment 212 to user interface environment 214.

Identification module 106(a) may identify any suitable trigger. For example, identification module 106(a) may identify a trigger by identifying a user's attempt to access data within user interface environment 212. In such embodiments, the data may be data associated with a different user interface environment (e.g., data projected from user interface environment 214 into user interface environment 212).

Additionally or alternatively, identification module 106(a) may identify an attempt to install an application associated with user interface environment 214, identify an attempt to access a portion of an application associated with user interface environment 214, identify an attempt to open a type of file associated with user interface environment 214, identify an attempt to access a file that contains content associated with user interface environment 214, identify an attempt to access a file that is tagged as being associated with user interface environment 214, identify an attempt to access a network associated with user interface environment 214, identify an attempt to access a website associated with user interface environment 214, and/or identify a user account control event associated with user interface environment 214.

Identification module 106(a) may identify such events by identifying a mouse click, identifying a mouse hover, identifying a keyboard entry, identifying execution of a particular program or segment of code, identifying an attempt to access a particular network, and/or by identifying any other input provided by the user or action performed within user interface environment 212. Upon identifying the input, code execution, or other event (e.g., network access attempt, etc.), determination module 104 may query swivel policy database 126(a) to determine whether the event detected by identification module 106(a) is associated with user interface environment 214. If the event is associated with user interface environment 214, identification module 106(a) may inform swivel module 108 that that computing system 210 should swivel into user interface environment 214.

At step 306 in FIG. 3, one or more of the systems described herein may, in response to the trigger, swivel into the second user interface environment by presenting the second user interface environment to a user in a manner that enables the user to interface with the second user interface environment. For example, swivel module 108 may, in response to the trigger, swivel computing system 210 into user interface environment 214 in a manner that enables a user to interface with user interface environment 214. A user may be enabled to interface with a user interface environment when the user can view the interface environment, when the user can provide input through the user interface environment, when the user interface environment is activated or started, when the user interface environment is brought to the foreground, and/or when the user is enabled to interface with the user interface environment through any other means.

Swiveling from one user interface environment to another user interface environment may be performed in a variety of ways. For example, swivel module 108 may swivel from user interface environment 212 to user interface environment 214 by removing user interface environment 212 from a foreground of a graphical user interface of computing system 210 and presenting user interface environment 214 in the foreground of the graphical user interface of computing system 210.

In embodiments where user interface environments 212 and 214 are presented as windows within a single graphical user interface (e.g., virtualized instances of applications), swiveling may be performed by bringing one user interface environment window to the foreground and moving the other user interface environment window to the background. In other embodiments, the user interface environments may not execute simultaneously. For example, user-interface environment 212 may be deactivated or terminated when swiveling into user interface environment 214, which may be activated or started.

As an example of the process illustrated in FIG. 3, a user may have a computing system with five virtual machines running—a first work virtual machine for handling managerial duties, a second work virtual machine for handling technical duties, a school virtual machine, a personal virtual machine, and a disposable virtual machine. Both work virtual machines may be locked down to prohibit the user from installing arbitrary software, storing personal information, or accessing unauthorized websites. The school virtual machine may be locked down in a similar manner. The disposable virtual machine may function as a sandbox that allows the user to install software and access websites without the risk of causing problems in the other environments.

The user may be using the first work virtual machine when an identification module detects an attempt to install an uncertified software program. Instead of installing the software program in the work virtual machine, the computing system may swivel into the disposable virtual machine and may automatically begin installation of the software program in the disposable virtual machine.

In another situation, the user may be working in the school virtual machine and may attempt to access a text document that contains technical work-related data. Since the full document may not be available from within the school virtual machine (e.g., only header information may be projected from the second work virtual machine to the school virtual machine), upon detecting the attempt to access the text document the computing system may swivel into the second work virtual machine.

As a third example, the user may be working in the personal virtual machine and may click on a bookmark for a website that is only available on a school intranet (e.g., the bookmark may be projected from the school virtual machine into the personal virtual machine). When the computing system detects the attempt to access the web site, the computing system may swivel into the school virtual machine, connect to the school intranet, and display the requested web site.

In a final example, the user may be working in the second virtual machine and may attempt to access employee contact data that is only available in the first work virtual machine. In this example, the contact names may be projected into the second virtual machine, but other contact data may not be available in the second virtual machine. When the computing system detects the attempt to access the contact, the computing system may swivel into the first work virtual machine and display the contact data to the user. This example shows how embodiments of the instant disclosure may allow a user with different roles in an enterprise to access data associated with the different roles without commingling the data for the different roles.

Figure 4:
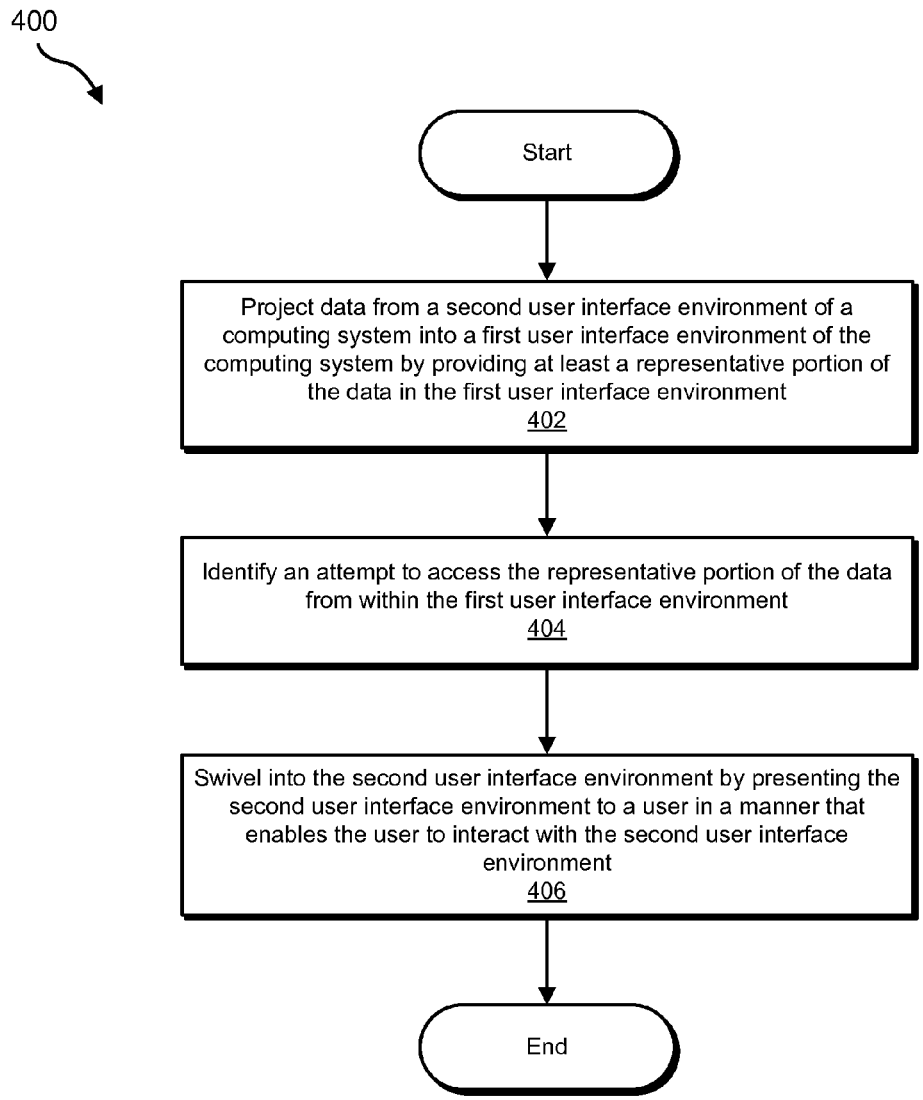
FIG. 4 is a flow diagram of an exemplary method for projecting data between user interface environments and transitioning between user interface environments.

FIG. 4 is a flow diagram of an exemplary computer-implemented method 400 for projecting data between user interface environments and using the projected data as a trigger for indicating when to swivel between the user interface environments. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 in FIG. 4, one or more of the systems described herein may project data from a second user interface environment of a computing system into a first user interface environment of the computing system by providing at least a representative portion of the data in the first user interface environment. For example, projection module 110(b) of user interface environment 214 may project data from user interface environment 214 into user interface environment 212. Projection module 110(b) may project data in any suitable manner. For example, projection module 110(b) may publish data to projected data database 122 by communicating with projection module 110(c), and projection module 110(c) may communicate with projection module 110(a) to transfer the data into user interface environment 212.

Any suitable type of data may be projected between user interface environments. Embodiments of the instant disclosure may apply to persistent data (e.g., calendar items, notes, etc.) and/or data associated with ephemeral events (e.g., notifications). Examples of data that may be projected between user interface environments include calendaring data, task data, notes, contact information, notification data, file system data, file metadata, Internet browser bookmarks, and/or data managed or created by any type of application (e.g., text documents, spreadsheets, image files, video files, audio files, etc.).

Data that is projected between environments may be identified in a number of ways. For example, projection policy databases 124(a) and 124(b) may store policies that identify data that is to be projected between user interface environments. Projection modules 110(a) and 110(b) may use the policies to identify data to be projected when the data is created, when the data is modified, at predetermined time intervals, and/or at any other time.

In some embodiments, data projection policies may be applied on a class of data (e.g., data from a particular application, data within a particular file type, etc.) and the policies may be overridden for individual pieces of data. For example, all calendar items from user interface environment 214, which may be a work environment, may be projected into user interface environment 212 with only times visible. An override policy may state that all calendar entries marked "holiday" are projected in their entirety from user interface environment 214 into user interface environment 212.

Projected versions of data may be transferred directly between user interface environments. Alternatively, a projection service external to the user interface environments, such as projection module 110(c), may manage projections. For example, projection module 110(b) may communicate with projection module 110(c) to subscribe to calendar data from user interface environment 212. Thus, when projection module 110(a) publishes calendar data by sending the data to projection module 110(c), projection module 110(c) may transfer the data to projection module 110(b). In some embodiments, projection module 110(c) may implement a common service protocol. For example, projection module 110(c) may project data between environments using a CalDAV protocol, a MICROSOFT EXCHANGE protocol, and/or any other protocol. In such embodiments, projections modules 110(a) and 110(b) may be plug-ins to existing applications.

Projection module 110(b) may project data from user interface environment 214 to user interface environment 212 by projecting all of the data or by projecting a portion of the data. For example, projection module 110(b) may project a representative portion of the data. As used herein, the phrase "representative portion of data" generally refers to any portion of data that conveys information about the data. For example, a representative portion of a calendar event may include a time and date of the calendar event but may not include a subject of the calendar event. As another example, a representative portion of an email may include header information for the email (e.g., sender, subject, time received, etc.) but may not include a body of the email. As a third example, a representative portion of a notification may simply indicate that an event has occurred and may not provide any other information about the event.

The representative portion of the data may be a non-sensitive portion of the data, and any potentially sensitive portions of the data may not be included in the representative portion of the data. A time and date of a calendar event may be non-sensitive portions of the calendar event, and a subject of the calendar event may be a sensitive portion of the calendar event. Similarly, some email data may be non-sensitive (e.g., a time the email was sent and who the email was sent from), while a subject and body of the email may contain sensitive information.

Projection policy databases 124(a) and 124(b) may include policies that identify which portions of data should be projected between user interface environments 212 and 214. Projection modules 110(a) and 110(b) may access these policies to determine which portions of data to project and may parse the data based on the policies.

Projection policies may be defined by administrators and/or other users. Additionally or alternatively, one or more projection policies may be defined by an application provider (e.g., a calendaring agent provider may provide projection policies for its calendaring agent).

At step 404 in FIG. 4, one or more of the systems described herein may identify an attempt to access the representative portion of the data from within the first user interface environment. In some embodiments, identification module 106(a) may identify an attempt to access the representative portion of the data from within user interface environment 212. For example, while working in user interface environment 212, a user may attempt to access an email projected into user interface environment 212 from user interface environment 214. Only header information for the email may be displayed in user interface environment 212, and identification module 106(a) may detect an attempt to click on the header information or otherwise access the email.

Identification module 106(a) may detect the attempt to access the representative portion of the data in a variety of other ways. Examples of other manners in which access attempts may be detected are presented in the description of step 304 of FIG. 3. Step 404 is similar to step 304 in FIG. 3 and the discussion of step 304 in FIG. 3 may apply to step 404 in FIG. 4.

At step 406 in FIG. 4, one or more of the systems described herein may, in response to the attempt to access the representative portion of the data, swivel into the second user interface environment by presenting the second user interface environment to a user in a manner that enables the user to interact with the second user interface environment. For example, swivel module 108 may, in response to the attempt to access the representative portion of the data, swivel into user interface environment 214 by presenting user interface environment 214 to a user in a manner that allows the user to interface with user interface environment 214. Continuing with the previous example, when the user attempts to access the email header projected into user interface environment 212, swivel module 108 may swivel from user interface environment 212 into user interface environment 214 to allow the user to see the full email.

After swiveling into user interface environment 214, the data from user interface environment 214 that was projected into user interface environment 212 may be automatically displayed to a user. For example, after swiveling into user interface environment 214, projection module 110(b) may launch the email application associated with the email that the user attempted to access in user interface environment 212. Projection module 110(b) may also cause the email to be displayed within the email application. To facilitate such automatic display of data, swivel module 108 may indicate to user interface environment 214 that the swivel was triggered by an attempt to access the email. In other words, swivel module 108 may provide information to user interface environment 214 that identifies the particular email that the user attempted to access.

Swivel module 108 may swivel between user interface environments in a variety of manners. Various examples of swiveling between user interface environments are provided in the discussion of the step 306 in FIG. 3. Step 406 in FIG. 4 is similar to step 306 in FIG. 3 and therefore the discussion of step 306 may apply to step 406.

An example of how the method of FIG. 4 may be implemented is presented in the following discussion of FIGS. 5 and 6. FIGS. 5 and 6 show exemplary graphical interfaces 500 and 600 that represent two different user interface environments. Graphical interface 500 shows a personal calendar of a user and represents a personal user interface environment of the user. Graphical interface 600 shows a work calendar of the user and represents a work user interface environment of the user. As shown, work appointments from the work environment (i.e., graphical interface 600) may be projected into the personal environment (i.e., graphical interface 500). In this example, the subjects of the appointments are not projected into the personal environment and are replaced with the generic text "work appointment." Personal appointments are not projected into the work environment. In other embodiments, all or any suitable portion of the personal appointment data may be projected into the work environment.

A user may be working in the personal environment and may view graphical interface 500. The user may want to view the work appointment at 11:00 a.m. When the user's mouse pointer hovers over the work appointment at 11:00 a.m., an identification module may interpret this user action as an attempt to access the appointment and may initiate swiveling between the user's personal environment and the user's work environment. A swivel module may swivel to the work environment, causing graphical interface 600 to be displayed to the user.

By projecting events between user interface environments and/or swiveling between user interface environments, isolation may be provided for sensitive data while sharing some data as seamlessly as possible. Thus, a user may have a single computer with separate work and personal environments (and/or other types of environments) that isolate sensitive information but share enough information to make the users experience more productive.

Figure 7:
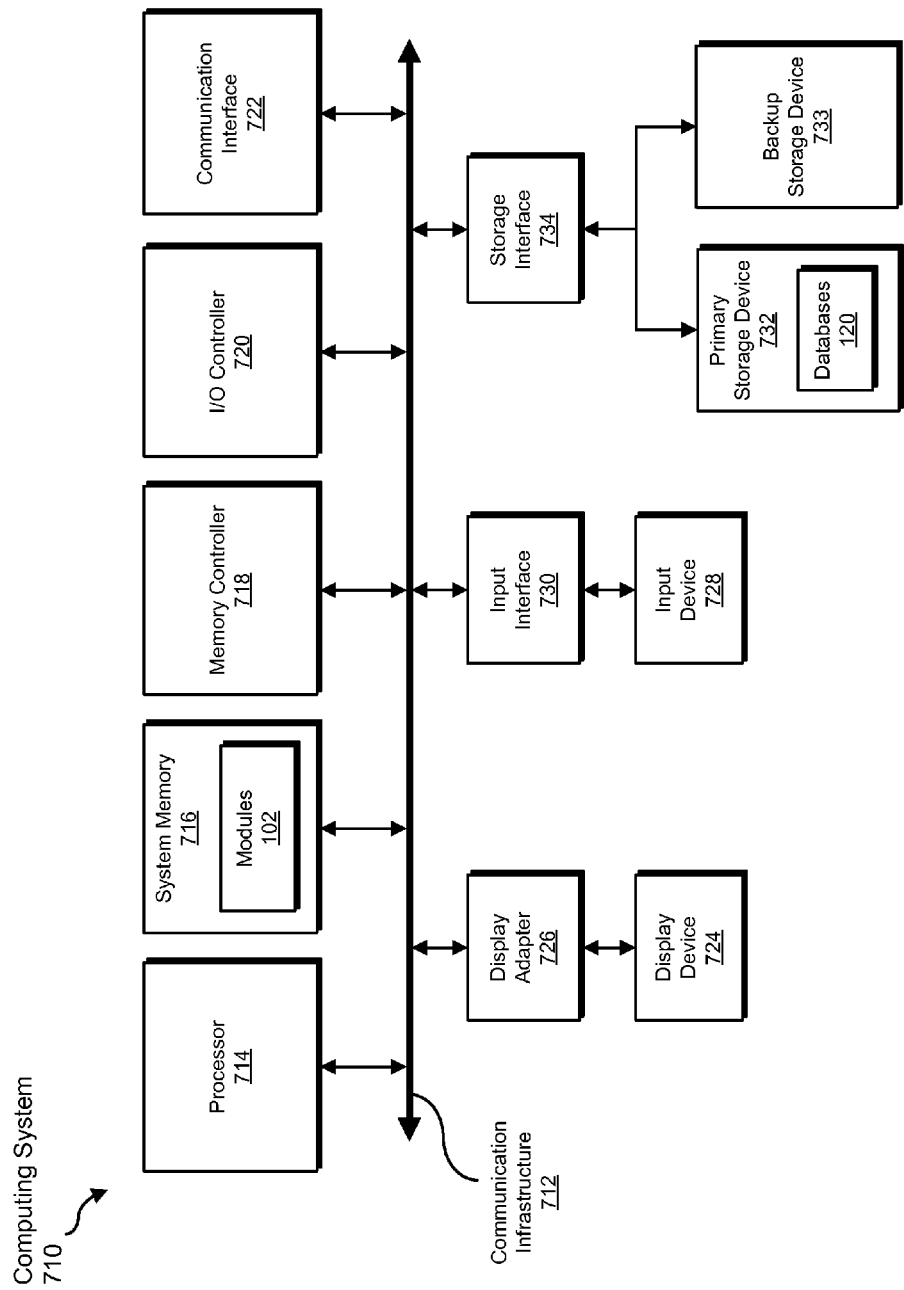
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the determining, identifying, swiveling, presenting, preventing, removing, receiving, sending, and projecting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as determining, identifying, swiveling, presenting, preventing, removing, receiving, sending, and projecting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the determining, identifying, swiveling, presenting, preventing, removing, receiving, sending, and projecting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the determining, identifying, swiveling, presenting, preventing, removing, receiving, sending, and projecting steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the determining, identifying, swiveling, presenting, preventing, removing, receiving, sending, and projecting steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the determining, identifying, swiveling, presenting, preventing, removing, receiving, sending, and projecting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
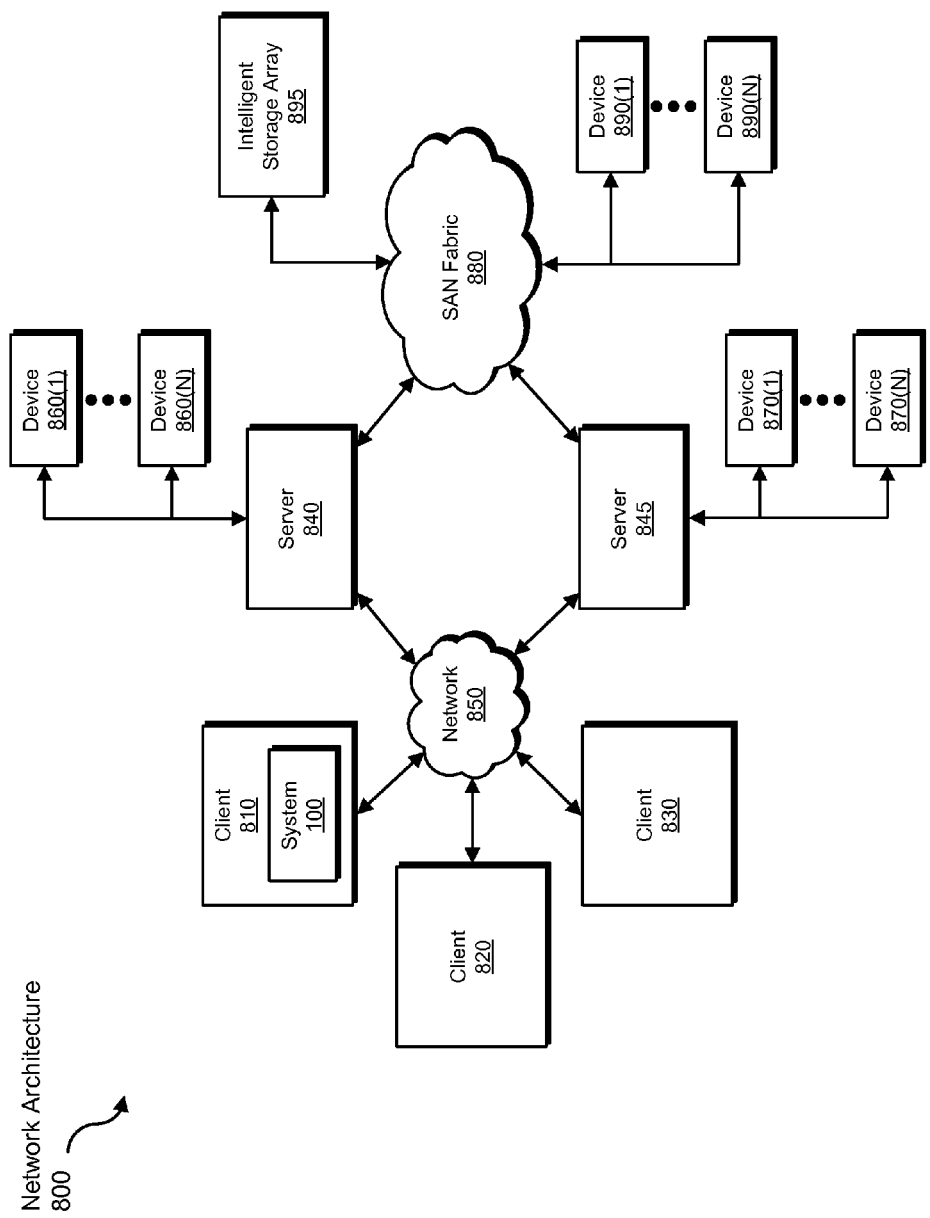
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the determining, identifying, swiveling, presenting, preventing, removing, receiving, sending, and projecting steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for transitioning between user interface environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned from, and/or to a cloud computing environment and/or one or more of modules 102 may operate in a cloud computing environment.

In addition, one or more of the modules described herein may transform data, physical devices, and/or representations of physical devices from one form to another. For example, a swivel module may transform a graphical interface by swiveling between different user interface environments.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for transitioning between user interface environments, at least a portion of the method being performed by a computing device comprising at least one processor, the method comprising:
    determining that a user is interacting with a first user interface environment of a computing system, wherein the first user interface environment comprises a first virtual machine running in a host environment and a second user interface environment of the computing system comprises a second virtual machine running in the host environment, wherein the second user interface environment comprises a work computing environment in which the user is able to access data stored on a network shared with other users and the first user interface environment comprises a personal computing environment in which the user is unable to access sensitive data;
    projecting, via a projection module in the host environment, a representative portion of the data from the second user interface environment into the first user interface environment while preventing a potentially sensitive portion of the data from being provided to the first user interface environment;
    identifying a trigger associated with switching from the first user interface environment-to the second user interface environment, wherein:
        identifying the trigger comprises at least one of identifying an attempt to access a calendar event associated with the second user interface environment or identifying an attempt to access an email associated with the second user interface environment;
    in response to the trigger, swiveling into the second user interface environment by presenting the second user interface environment to the user in a manner that enables the user to interact with the second user interface environment; and
    automatically initiating, from within the second user interface environment, the action attempted by the user.

2. The method of claim 1, further comprising:
    establishing projection policies of the projection module, the projection policies defining which of the data are the representative portion and which of the data are the potentially sensitive portion, wherein the projection policies are established by a person other than the user.

3. The method of claim 1, wherein:
    projecting the representative portion comprises displaying the representative portion in a graphical user interface together with data pertaining to the first user interface environment.

4. The method of claim 1, wherein projecting the representative portion comprises projecting header information for the email into the first user interface while preventing the body of the email from being provided to the first user interface environment or projecting a time and a date of the calendar event into the first user interface while preventing a subject of the calendar event from being provided to the first user interface environment.

5. The method of claim 1, wherein:
    identifying the trigger comprises receiving a user selection through the first user interface environment to access the calendar event or access the email.

6. The method of claim 1, wherein:
    swiveling into the second user interface environment comprises removing the first user interface environment from a foreground of a graphical user interface of the computing system.

7. The method of claim 1, wherein:
    swiveling into the second user interface environment comprises terminating the first user interface environment.

8. The method of claim 1, wherein:
    the calendar event comprises the data projected from the second user interface environment into the first user interface environment such that at least a representative portion of the calendar event is provided in the first user interface environment but a potentially sensitive portion of the calendar event is prevented from being provided to the first user interface environment.

9. The method of claim 1, wherein:
    the email comprises the data projected from the second user interface environment into the first user interface environment such that at least a representative portion of the email is provided in the first user interface environment but a potentially sensitive portion of the email is prevented from being provided to the first user interface environment.

10. A system for swiveling between user interface environments, the system comprising:
    at least one processor;
    a determination module programmed to direct the processor to determine that a user is interacting with a first user interface environment of a computing system, wherein the first user interface environment comprises a first virtual machine running in a host environment and a second user interface environment of the computing system comprises a second virtual machine running in the host environment, wherein the second user interface environment comprises a work computing environment in which the user is able to access data stored on a network shared with other users and the first user interface environment comprises a personal computing environment in which the user is unable to access sensitive data;

a projection module running in the host environment and programmed to project a representative portion of the data from the second user interface environment into the first user interface environment while preventing a potentially sensitive portion of the data from being provided to the first user interface environment;

an identification module programmed to direct the processor to identify a trigger associated with switching from the first user interface environment to the second user interface environment, wherein:

identifying the trigger comprises at least one of identifying an attempt to access a calendar event associated with the second user interface environment or identifying an attempt to access an email associated with the second user interface environment;

a swivel module programmed to, in response to the trigger, swivel into the second user interface environment by presenting the second user interface environment to the user in a manner that allows the user to interact with the second user interface environment and to automatically initiate, from within the second user interface, the action attempted by the user.

11. The system of claim 10, wherein the projection module comprises projection policies defining which of the data are the representative portion and which of the data are the potentially sensitive portion, wherein the projection policies are established by a person other than the user.

12. The system of claim 10, wherein projecting the representative portion comprises displaying the representative portion in a graphical user interface together with data pertaining to the first user interface environment.

13. The system of claim 10, wherein:
identifying the trigger comprises receiving a user selection through the first user interface environment to access the calendar event or access the email.

14. The system of claim 10, wherein:
the swivel module is programmed to swivel into the second user interface environment by removing the first user interface environment from a foreground of a graphical user interface of the computing system.

15. The system of claim 10, wherein:
the host environment comprises a hypervisor.

16. A non-transitory computer-readable medium comprising one or more computer-executable instructions that, when executed by at least one processor of a computing device, cause the computing device to:

determine that a user is interacting with a first user interface environment of a computing system, wherein the first user interface environment comprises a first virtual machine running in a host environment and a second user interface environment of the computing system comprises a second virtual machine running in the host environment, wherein the second user interface environment comprises a work computing environment in which the user is able to access data stored on a network shared with other users and the first user interface environment comprises a personal computing environment in which the user is unable to access sensitive data;

project, via a projection module in the host environment, a representative portion of the data from the second user interface environment into the first user interface environment while preventing a potentially sensitive portion of the data from being provided to the first user interface environment;

identify a trigger associated with switching from the first user interface environment to the second user interface environment, wherein:

identifying the trigger comprises at least one of identifying an attempt to access a calendar event associated with the second user interface environment or identifying an attempt to access an email associated with the second user interface environment;

in response to the trigger, swivel into the second user interface environment by presenting the second user interface environment to the user in a manner that enables the user to interact with the second user interface environment; and automatically initiate, from within the second user interface environment, the action attempted by the user.

17. The non-transitory computer-readable medium of claim 16, wherein the one or more computer-executable instructions are programmed to cause the computing device to project the representative portion by projecting header information for the email into the first user interface while preventing the body of the email from being provided to the first user interface environment or projecting a time and a date of the calendar event into the first user interface while preventing a subject of the calendar event from being provided to the first user interface environment.

18. The non-transitory computer-readable medium of claim 16, wherein the one or more computer-executable instructions are programmed to cause the computing device to:

establish projection policies of the projection module, the projection policies defining which of the data are the representative portion and which of the data are the potentially sensitive portion, wherein the projection policies are established by a person other than the user.

19. The non-transitory computer-readable medium of claim 16, wherein the one or more computer-executable instructions are programmed to cause the computing device to project the representative portion by displaying the representative portion in a graphical user interface together with data pertaining to the first user interface environment.

20. The non-transitory computer-readable medium of claim 16, wherein the one or more computer-executable instructions are programmed to identify the trigger by receiving a user selection through the first user interface environment to access the calendar event or access the email.

* * * * *

UNITED STATES PATENT AND TRADEMARK OFFICE
CERTIFICATE OF CORRECTION

| | | |
|---|---|---|
| PATENT NO. | : 8,839,138 B1 | Page 1 of 1 |
| APPLICATION NO. | : 12/643181 | |
| DATED | : September 16, 2014 | |
| INVENTOR(S) | : Joseph Pasqua | |

It is certified that error appears in the above-identified patent and that said Letters Patent is hereby corrected as shown below:

In the Claims

Claim 1, at column 17, lines 55 to 57, should read:
identifying a trigger associated with switching from the first user interface environment to the second user interface environment, wherein:

Signed and Sealed this
Twenty-fifth Day of August, 2015

Michelle K. Lee
*Director of the United States Patent and Trademark Office*